US011915066B2

(12) United States Patent
Feng et al.

(10) Patent No.: US 11,915,066 B2
(45) Date of Patent: Feb. 27, 2024

(54) SYSTEM TO FACILITATE TRANSITION TO MICROSERVICES

(71) Applicant: SAP SE, Walldorf (DE)

(72) Inventors: Chen Feng, Shanghai (CN); Yang Liu, Shanghai (CN); Xia Yu, Shanghai (CN); Yiliang Liu, Shanghai (CN)

(73) Assignee: SAP SE, Walldorf (DE)

( * ) Notice: Subject to any disclaimer, the term of this patent is extended or adjusted under 35 U.S.C. 154(b) by 81 days.

(21) Appl. No.: 17/318,500

(22) Filed: May 12, 2021

(65) Prior Publication Data
US 2022/0365832 A1  Nov. 17, 2022

(51) Int. Cl.
G06F 9/54 (2006.01)
G06F 9/46 (2006.01)

(52) U.S. Cl.
CPC .............. G06F 9/547 (2013.01); G06F 9/466 (2013.01)

(58) Field of Classification Search
CPC ................................. G06F 9/547; G06F 9/466
See application file for complete search history.

(56) References Cited

U.S. PATENT DOCUMENTS

| | | | | |
|---|---|---|---|---|
| 10,747,600 | B2* | 8/2020 | Neijenhuis | G06F 9/548 |
| 2008/0222237 | A1* | 9/2008 | Nathan | G06F 8/38 |
| | | | | 709/202 |
| 2008/0222572 | A1* | 9/2008 | Nathan | G06F 8/34 |
| | | | | 715/855 |
| 2017/0168664 | A1* | 6/2017 | Kashyap | G06T 11/206 |
| 2017/0187785 | A1* | 6/2017 | Johnson | H04L 51/42 |
| 2020/0012583 | A1* | 1/2020 | Walters | G06Q 10/04 |
| 2020/0167133 | A1* | 5/2020 | Suresh | G06F 8/70 |

FOREIGN PATENT DOCUMENTS

JP          2011048559 A  *  3/2011

OTHER PUBLICATIONS

Chris Richardson; Microservices Patterns: With Examples in Java; 512 pages (Year: 2018).*

* cited by examiner

Primary Examiner — Kevin L Young
Assistant Examiner — Kimberly L Jordan
(74) Attorney, Agent, or Firm — Buckley, Maschoff & Talwalkar LLC

(57) ABSTRACT

Systems and methods provide reception of a call to a first function, determination of a first configuration file associated with the first function, the first configuration file indicating a primary function, a secondary function and a relationship between a first property of the primary function and a second property of the secondary function, calling of the primary function and reception of a corresponding first result set, calling of the secondary function, the call to the secondary function including a filter on the second property based on values of the first result set associated with the first property, reception of a second result set corresponding to the call to the secondary function, generation of a composed result set based on the first result set, the second result set, and the relationship, and return of the composed result set in response to the call to the first function.

16 Claims, 8 Drawing Sheets

```
                                    ╭210                              ╭220
User.svc                              Job.svc
{                                     {
  "entities": [                         "entities": [
    "name": "User",                       "name": "Job",
    "properties": [                       "properties": [
      "userId",                             "jobTitle",
      "userName",                           "jobId"
      "userJobId"                         ]
    ]                                     ]
  ]                                     }
}
```

*FIG. 2*

```
                                    ╭300
{
  "entities": [
    {
      "name": "UserProfile",
      "mappingFrom": "User.svc/User",
      "properties": [
        {
          "name": "userId"
        },
        {
          "name": "userName"
        },
        {
          "name": "jobTitle",
          "mappingFrom": "user-job/jobTitle"
        }
      ]
    }
  ],
  "relationships": [
    {
      "name": "user-job",
      "source": "User.svc/User",
      "sink": "Job.svc/Job",
      "joinPredicates": [
        {
          "left": "userJobId",
          "right": "jobId"
        }
      ]
    }
  ]
}
```

*FIG. 3*

SYSTEM TO FACILITATE TRANSITION TO MICROSERVICES

BACKGROUND

A typical "monolithic" software application may provide many different, but related, functionalities. For example, a monolithic customer relationship management application may provide a contact management module, a calendaring module, and a lead generation module. In some examples, a monolithic application includes a front-end user interface (UI) application (e.g., which runs on a browser of a local device) and a back-end application which provides data access and processing. The back-end application may expose remote APIs (e.g., REST/OData), which are typically fine-grained and called by the front-end UI application to build UI pages or perform integration.

In a microservices architecture, distinct functions are implemented using respective independently-deployed microservices. A consumer accesses each of such microservices independently of other microservices. A microservices architecture may be particularly suited to cloud implementations, in which each microservice may be implemented by a dedicated and elastic virtual machine.

Current trends include migration of traditional monolithic applications to a microservices-based architecture. For example, it may be desirable to migrate a back-end module of a monolithic application to a set of independent microservices. Changing the back-end monolithic module to a plurality of microservices may include changing a current API of the module, merging several current APIs into a single API, or separating a current API into more than one API. Substantial changes to the front-end UI application may also be required to account for these back-end API changes, introducing many regressions and increased testing time. Moreover, while only one or two back-end API requests may have been previously required to render a front-end UI page in a monolithic application, rendering of the same UI page using microservices may require substantially more requests since the APIs and data might no longer be co-located.

As monolithic back-end processes are being replaced with microservices, systems are desired to provide configurable, flexible, protocol-independent migration of monolithic applications to microservices. Such systems may provide stable APIs for front-end consumption which are transparent to changes to back-end APIs.

BRIEF DESCRIPTION OF THE DRAWINGS

FIG. 2 illustrates back-end APIs for use in an API mashup according to some embodiments.

FIG. 3 illustrates an API configuration file for use by an EFF according to some monolithic embodiments.

DETAILED DESCRIPTION

The following description is provided to enable any person in the art to make and use the described embodiments. Various modifications, however, will remain readily-apparent to those in the art.

Some embodiments facilitate migration of monolithic application modules to microservices by providing a configuration file which may be executed by an EFF of a monolithic application or by a BFF associated with microservices to manage calls to lower-level APIs. Using these components, migration of one or more functions of a monolithic application module to one or more microservices may be transparent to a front-end UI application.

Thus, an end user customer predominantly maintains the existing front-end UI if the monolithic application modules are decommissioned and replaced in favor of using microservices. These embodiments flexibly allow an end user customer to continue to use monolithic applications, while avoiding significant redevelopment and delays caused by needing to reconfigure the front-end UI once the monolithic applications are replaced with microservices. Some embodiments also provide flexibility for an end user customer to use monolithic applications alongside microservices without requiring a complete conversion of all monolithic applications to microservices.

Rendering of a UI page may require multiple API calls to a back-end, and in some embodiments the configuration file provides information allowing the front-end UI application to instead execute a single API call and receive a single result set. For example, a configuration file may describe multiple APIs provided by monolithic application modules and which correspond to the single API call. The configuration file may also describe how to use a result set returned by one of the APIs to construct a call to another of the APIs, and how to compose all returned result sets into a single result set for return to the front-end UI application.

Advantageously, the same configuration file may be used to call the multiple APIs once these APIs are migrated from a monolithic application to a plurality of independent microservices. Use of a uniform configuration to manage intraprocess APIs (i.e., APIs of a single monolithic application) and interprocess APIs (i.e., APIs of independent microservices) thereby facilitates decoupling of monolithic application modules to one or microservices.

Figure 1:
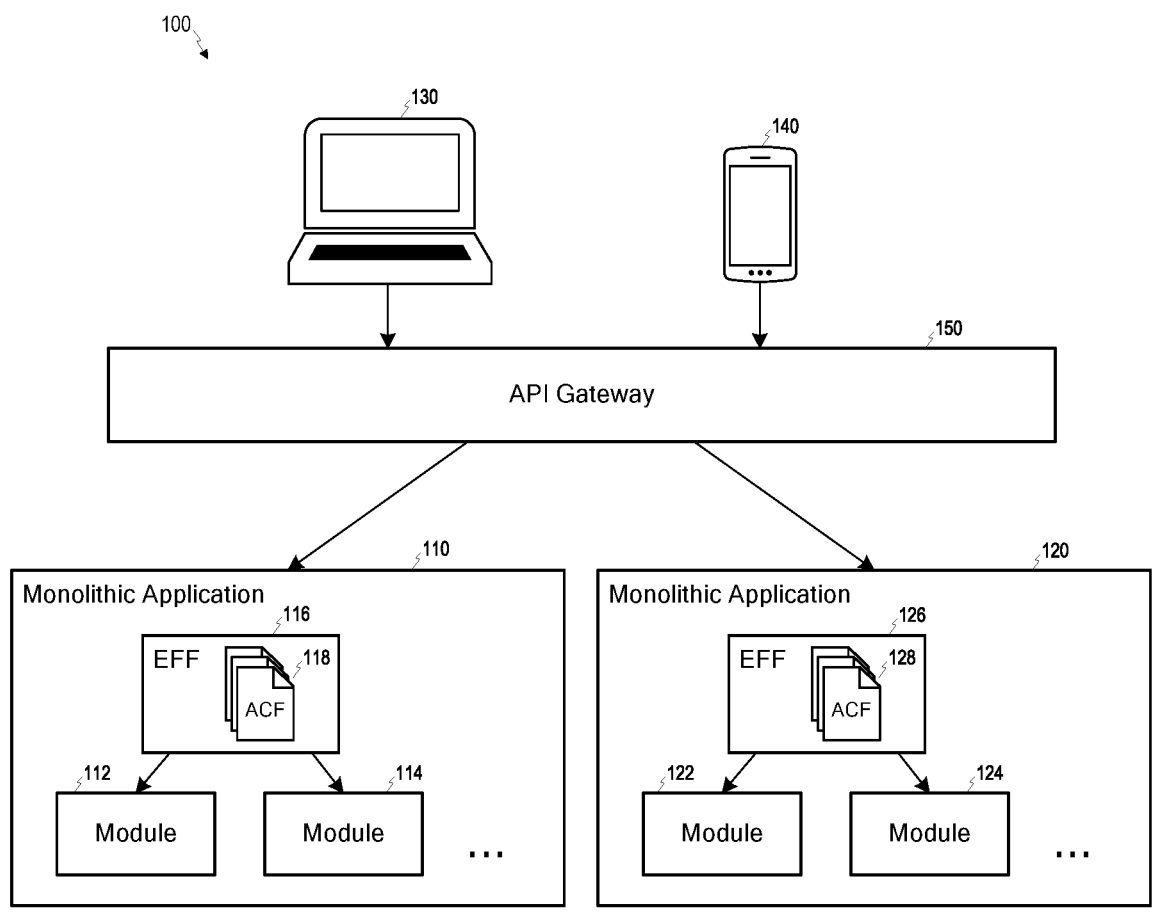
FIG. 1 illustrates an architecture in which monolithic applications include Engines For Front-end (EFFs) and API configuration files according to some embodiments.

FIG. 1 is a block diagram of monolithic architecture 100 according to some embodiments. The illustrated elements of architecture 100 may be implemented using any suitable combination of computing hardware and/or software that is or becomes known. In some embodiments, two or more elements of architecture 100 are implemented by a single computing device. One or more elements of architecture 100 may be implemented as an on-premise system and/or using cloud-based server resources.

Monolithic application 110 may comprise a software application written using any programming language (e.g., Java). Monolithic application 110 includes modules 112 and 114, each of which is a particular function, process, data structure or any combination of the foregoing, that when packaged together, provides the functionality the end user is expecting from the monolithic application 110. As many of these modules are designed to interact with each other and with the end user in order to provide end user functionality, many such modules 112 and 114 may implement their own respective APIs.

Consuming devices 130 and 140 may execute front-end UI applications, such as a Javascript application executing within a Web browser. Execution of these applications results in the transmission of API calls to API gateway 150. API gateway 150 directs the API calls to the appropriate monolithic application and routes results back to the front-end UI application. In some embodiments, the front-end UI application will need to interact with each module 112 and 114, or even additional modules not shown, individually in order to compile a complete response that can be displayed to the user through the front-end UI application. In such embodiments, a consumer independently calls the APIs exposed by modules 112 and 114 and composes received result sets on the front-end UI application. This pattern can be unsuitably time- and power-consuming, particularly for mobile consumers.

According to some embodiments, monolithic application 110 includes EFF 116 and associated API configuration files (ACFs) 118. EFF 116 receives API calls from front-end-UI applications (via gateway 150), identifies a corresponding ACF 118, and interprets the ACF 118 to determine how to call APIs of modules 112 and/or 114 and compose a single result set based on returned results. EFF 116 is written in a same programming language (e.g., Java) as modules 112 and 114 and therefore may access the APIs exposed by modules 112 and 114 as determined via an ACF 118 via in-process API calls (e.g., Java API calls).

Monolithic application 120 includes modules 122 and 124 as described above with respect to monolithic application 110 and modules 112 and 114. EFF 126 and ACFs 128 may operate similarly as described above with respect to EFF 116 and ACFs 118. EFF 126, module 122 and 124 are written in a same programming language and execute in a same process, enabling in-process API calls between EFF 126 and modules 122 and 124. Monolithic application 120 and monolithic application 110 execute in different processes and may be written in the same or different programming languages.

Generally, a developer of a monolithic application may generate an ACF to describe how to compose multiple API calls into a single front-end API call, allowing the front-end UI application to fetch all data from the multiple modules by generating multiple API calls to the multiple modules that are derived from a single call to the back-end from the front-end application residing on consuming devices 130 and 140. This ACF may be re-used as will be described below to facilitate migration of a module or modules of the monolithic application to one or more microservices. In particular, using the ACF, the front-end UI application may still use the same single call to fetch all data from the multiple microservices using multiple API calls even after the modules have been migrated to microservices.

According to some embodiments, an ACF conforms to JSON format and exhibits the following structure:

- "entities": An array of APIs encapsulated by the ACF.
  - "name": The name of the API which will correspond to the ACF and which will be exposed.
  - "mappingFrom": Specifies a main data source API, patterned as {serviceName}/{APIName}. May comprise a function (e.g., an OData service or a REST API).
  - "properties": An array of fields of the main data source API.
    o "name": The name of a field.
    o "mappingFrom"(Optional): Specifies the data source of a field, using the pattern {relationshipName}/{name}. The relationshipName is defined below and describes a mapping to another API based on a group of join predicates. If this "mappingFrom" property is not specified, the field of the main data source API having the same name is simply imported.
- "relationships": Defines a group of relationships between the different microservices/modules.
  - "name": A relationship name which will be used by above-described "mappingFrom" property of "properties" to identify the relationship.
  - "source": Specifies an API using the pattern {serviceName}/{APIName}.
  - "sink": Specifies a following API using the pattern {serviceName}/}APIName}.
  - "joinPredicates": A group of join predicates that build the "equal" criteria.
    o "left": A property name of the of main data source API.
    o "right": A property name of the following API.

FIG. 2 illustrates example APIs 210 and 220 and FIG. 3 illustrates example ACF 300 for purposes of describing the format of an ACF according to some embodiments. Generally, ACF 300 describes a new API "UserProfile" which provides properties "userId" and "username" from API 210 named "User" and property "jobTitle" from API 220 named "Job". As shown in ACF 300, the relationship named "user-job" specifies that each record returned record by UserProfile must be one in which the value of "userJobId" returned by User 210 value equals the value of "jobId" returned from Job 220.

Based on ACF 300, EFF 116 may translate a received API call to "UserProfile" into multiple in-process calls to the underlying code implementations of User 210 and Job 220. EFF 116 receives returned values from each in-process call, and merges the values into one response based on ACF 300. The merged values are then returned to the caller. Advantageously, changes to the names of APIs 210 and 220 or to their respective property names may be addressed by changing corresponding entries of ACF 300. These changes are thereby transparent to the front-end UI application. Thus, the number of API calls from consuming devices 130 and 140 through API gateway 150 are less than the API calls among the various modules within a monolithic application.

Figure 4:
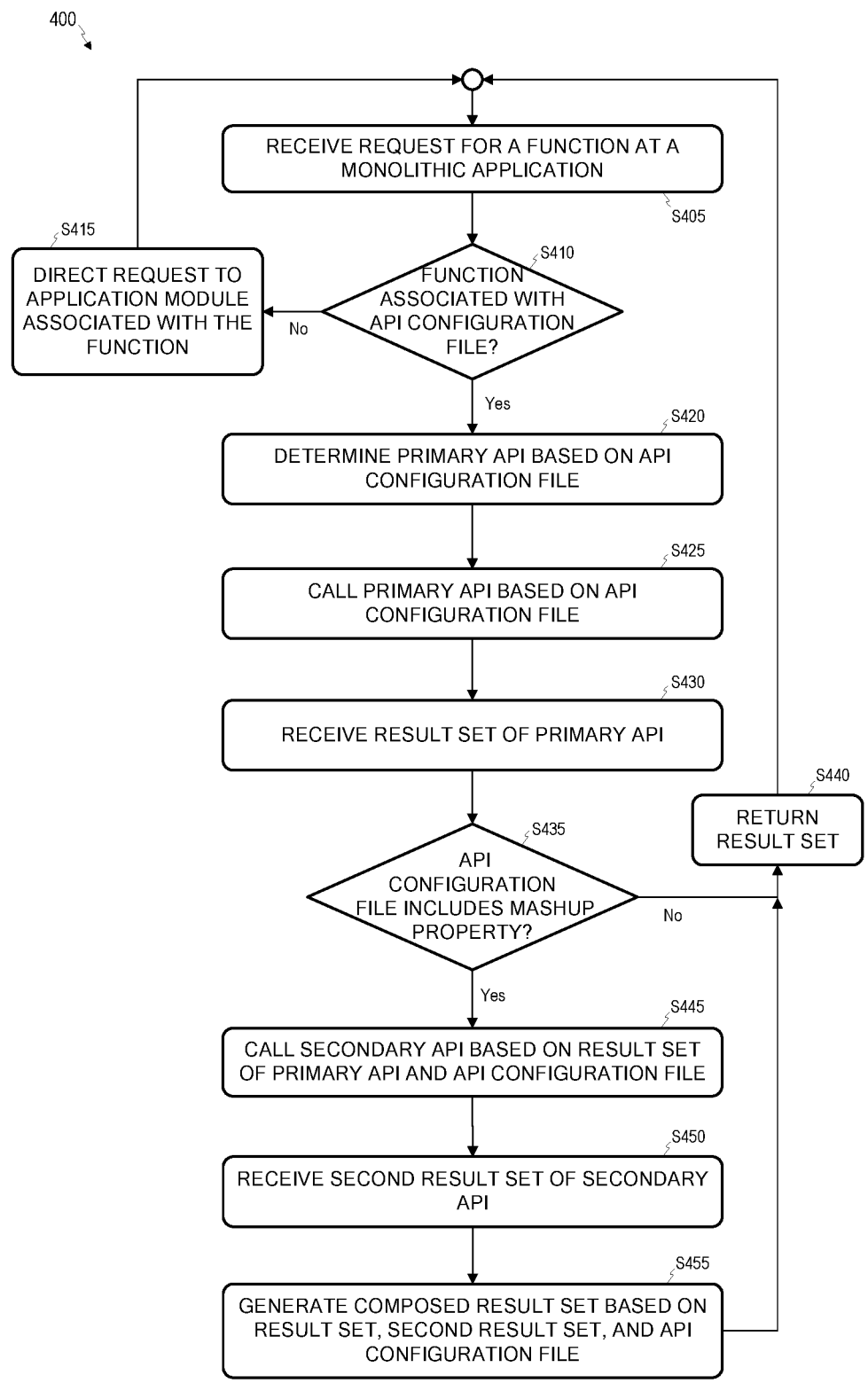
FIG. 4 is flow diagram of a process for an EFF to generate a result set based on a received API request according to some monolithic embodiments.

FIG. 4 is a flow diagram of process 400 according to some embodiments. Process 400 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, at S405, a request for a function is received at a monolithic application. A function as used herein may comprise an OData service, a REST API or other callable process.

In one example, a user may operate a client device (e.g., a desktop computer) to execute a Web browser application. The user may select or otherwise input a Uniform Resource Locator associated with a monolithic application, causing the Web browser to download a corresponding front-end application, if the front-end application is not already stored on the client device. According to some embodiments, the user is subjected to an authorization protocol (e.g., password, multi-factor authentication) prior to receiving the front-end UI application.

Manipulation of the front-end UI application may trigger a request for a function, which is transmitted via a gateway (for example) to a corresponding back-end application at S405. At S410, it is determined whether the requested function is associated with an ACF. As described above, the back-end application may include an EFF which has access to one or more ACFs. Each of these ACFs is associated with a name (e.g., UserProfile), also as described above. Accordingly, the EFF may determine at S410 whether an ACF is available which has the same name as the requested function.

Flow proceeds to S415 if no ACF is associated with the requested function. At S415, the EFF simply directs the request to an application module of the monolithic application which is associated with the function. The application module executes the function and a result set is returned to the front-end application. Flow then pauses while awaiting a next request for a function.

If it is determined at S410 that the requested function is associated with an ACF, a primary API is determined at S420 based on the associated ACF. The primary API is determined based on the pre-defined format of the ACF. Referring to the format exhibited by ACF 300 of FIG. 3, the primary API is named User.

The EFF forwards a request to an application module associated with the primary API at S425. As noted in ACF 300, the primary API User is associated with a function named User.svc. The EFF has access to information (e.g., a registry) describing which functions are supported by which modules of the monolithic application and therefore, in the present example, the EFF uses this information to determine a module associated with the function User.svc at S425.

The primary API is called based on the ACF at S425. With respect to ACF 300, the primary API User is called at S425 and a result set including properties userId, userName and userJobId is received at S430.

At S435, it is determined whether the ACF includes a "mashup" property. A mashup property is a property which is determined by using the results of a call to one API call to filter a call to another API. Such properties may be identified in the example ACF format described above as those properties associated with a "name" field and with a "mappingFrom" field. If no mashup properties exist, the current result set is returned to the front-end UI application at S440.

It should be noted that the ACF may include several primary APIs which include respective properties associated with a "name" field and no "mappingFrom" field. That is, values for these properties may simply be determined by calling their respective APIs. In such cases, all the primary APIs are called at S425, corresponding result sets are received at S430, and all of the result sets are returned at S440.

Flow proceeds from S435 to S445 if it is determined that the ACF includes at least one mashup property. At S445, a secondary API is called based on the result set returned from a primary API and on the ACF. For example, ACF 300 includes a mashup property named jobTitle and associated with the mappingFrom field value "user-job/jobTitle". "user-job" specifies a relationship which defines the mashup property. In particular, the primary API (i.e., "source") of the relationship is User API 210 and the secondary API (i.e., "sink") of the relationship is Job API 220.

By virtue of the join predicates specified in ACF 300, it is determined that the call to the secondary API should be filtered by the userJobId values of the result set of the call to the primary API received at S430. Accordingly, secondary Job API 220 is called at S445 using the returned values of the userJobId field to filter the jobid field of Job API 220.

A second result set is received at S450 based on the call to the secondary API. Next, at S455, a composed result set is generated based on the result set received at S430, the second result set received at S450, and the ACF. Continuing the present example, ACF 300 specifies left and right join predicates "userJobId" and "jobid", respectively. Therefore, at S455, the result set received at S430 and the second result set received at S450 are joined using these predicates. The resulting composed result set is returned to the requestor at S440 as described above.

It should be noted that embodiments of an ACF may specify more than one primary API which is associated with one or more secondary APIs. In such a case, a composed result set corresponding to each primary API is generated and returned as described above.

Figure 5:
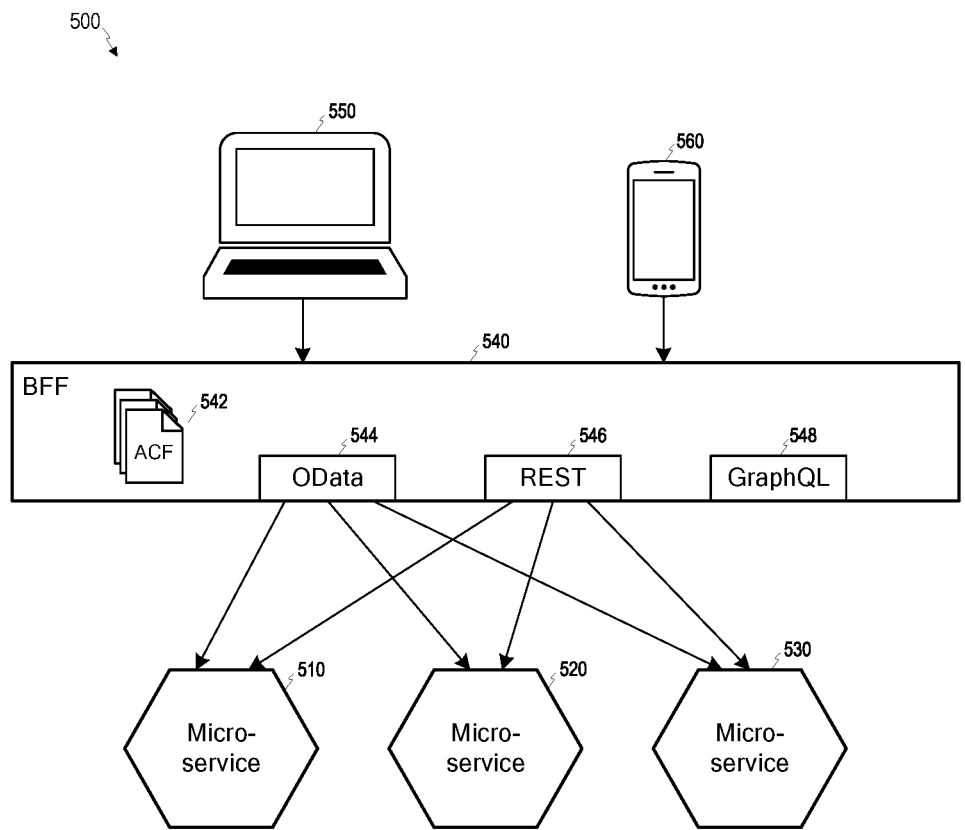
FIG. 5 illustrates an architecture in which a Back-end For Front-end (BFF) uses API configuration files for accessing microservices according to some embodiments.

A case is now considered in which it is desired to migrate one or more in-process modules from a monolithic application which support a back-end API underlying the "UserProfile" API into one or more corresponding microservices. Such a change may be supported by copying the corresponding ACF to a BFF as illustrated in FIG. 5. As a result, front-end UI application code accessing "UserProfile" API need not be modified in response to the migration.

When copying an ACF from an EFF to a BFF, some embodiments may change the extension of the ACF from .eff to .BFF. Such a change might benefit implementations including an EFF and a BFF which access a same registry of ACFs.

Architecture 500 includes microservices 510, 520 and 530. At least one of microservices 510, 520 and 530 may have been migrated from a module of a monolithic application. The migrated microservice may therefore support an API which was supported by the module from the monolithic application.

BFF 540 receives API calls from front-end UI applications (e.g., executing on devices 550 and 560), identifies a corresponding ACF 542 (if one exists), and interprets the ACF 542 to determine how to call APIs of microservices 510, 520 or 530. Similar to EFF 116 of architecture 100, BFF 540 also composes a single response from responses received from microservices 510, 520 and 530 based on the corresponding ACF 542.

Unlike EFF 116, BFF 540 calls the microservices via interprocess calls rather than via in-process method invocation. Accordingly, BFF 540 interprets ACFs 542 to determine the appropriate calling protocol for each request. In one example, ACFs 542 support a function naming convention from which BFF 540 may determine the type of function and therefore its appropriate calling protocol. The present example uses the .svc extension to indicate an OData service and a/b/user to indicate a REST API. In other implementations, an ACF includes a specific parameter for indicating the protocol.

BFF 540 may be implemented within an existing API gateway. In some embodiments, BFF 540 is implemented in a separate layer. In the latter case, an API gateway may provide authentication, authorization, and load balancing, as well as the routing of requests to BFF 540.

Figure 6:
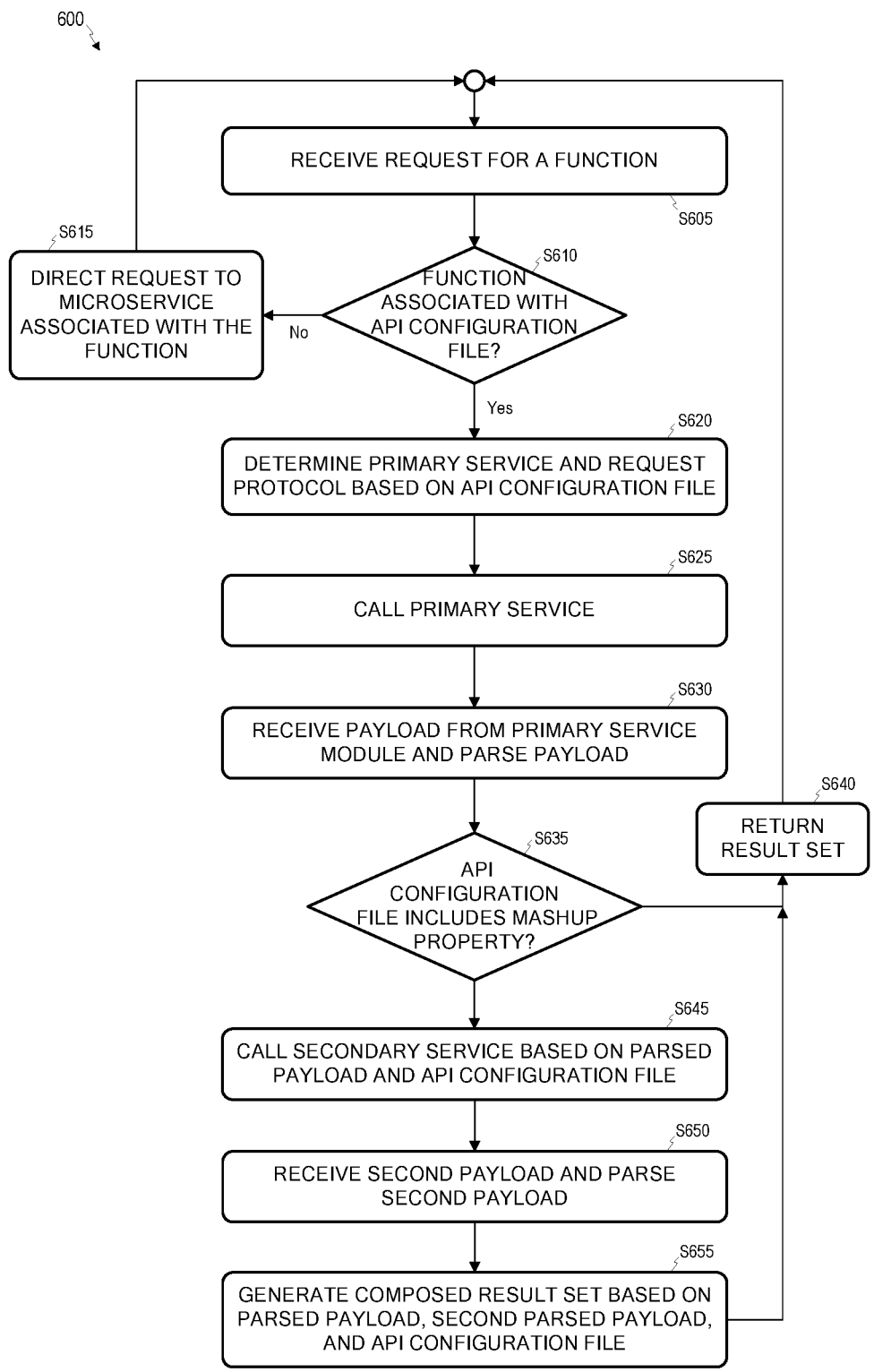
FIG. 6 is flow diagram of a process for a BFF to generate a result set based on a received API request according to some microservice embodiments.

FIG. 6 is a flow diagram of process 600 which may be performed by a BFF according to some embodiments. A request for a function is received by a BFF at S605. The request may be generated by a front-end UI application. In one example, the function is provided via one or more microservices, and the request is identical to a request previously used by the front-end UI application to access the function when the function was provided by one or more modules of a monolithic application.

At S610, it is determined whether the requested function is associated with an ACF. BFF 540 may store or otherwise access a repository of one or more ACFs, each of which is associated with a name. S410 may therefore comprise a determination if whether any of ACFs 542 have the same name as the requested function.

If no ACF is associated with the requested function, the BFF directs the request to an microservice which is associated with the function. The microservice returns a corresponding result to the BFF, which is then returned to the front-end UI application. Flow then pauses while awaiting a next request for a function.

If the requested function is associated with an ACF, a primary function is determined at S620 based on the associated ACF as described with respect to S420. Also determined at S620, and unlike S420, is a protocol associated with the request. For example, a .svc extension indicates an OData service and a/b/user indicates a REST API.

The primary function is called at S625 using the determined protocol. BFF 540 includes protocol interfaces 544, 546 and 548 which support calls conforming to various protocols. S625 comprises calling a microservice which is associated with the primary function. This microservice may be identified via a registry associating functions with microservices.

A result is received at S630. According to some embodiments, and in view of the interprocess nature of the call, the received result is encapsulated within a JavaScript Object Notation (JSON) payload. The payload is parsed at S630 to extract the result.

Next, at S635, it is determined whether the ACF includes a "mashup" property. If no mashup properties exist, the current result set is returned to the front-end UI application at S640. As described with respect to process 400, the ACF may include several primary functions, none of which include mashup properties. In such cases, all of these primary functions are called at S625 and corresponding result sets are returned to the front-end UI application at S640.

Flow proceeds to S645 if it is determined that the ACF includes at least one mashup property. A secondary function is called at S645 based on the previously-parsed payload and on the ACF as described above with respect to S445. A second payload is received and parsed at S450 to generate a second result set. Then, at S655, a composed result set is generated based on the parsed payload of S630, the second parsed payload, and the ACF. The composed result set may reflect join predicates specified in the ACF as described above. The composed result set is returned to the front-end UI application at S640 as described above.

Figure 7:
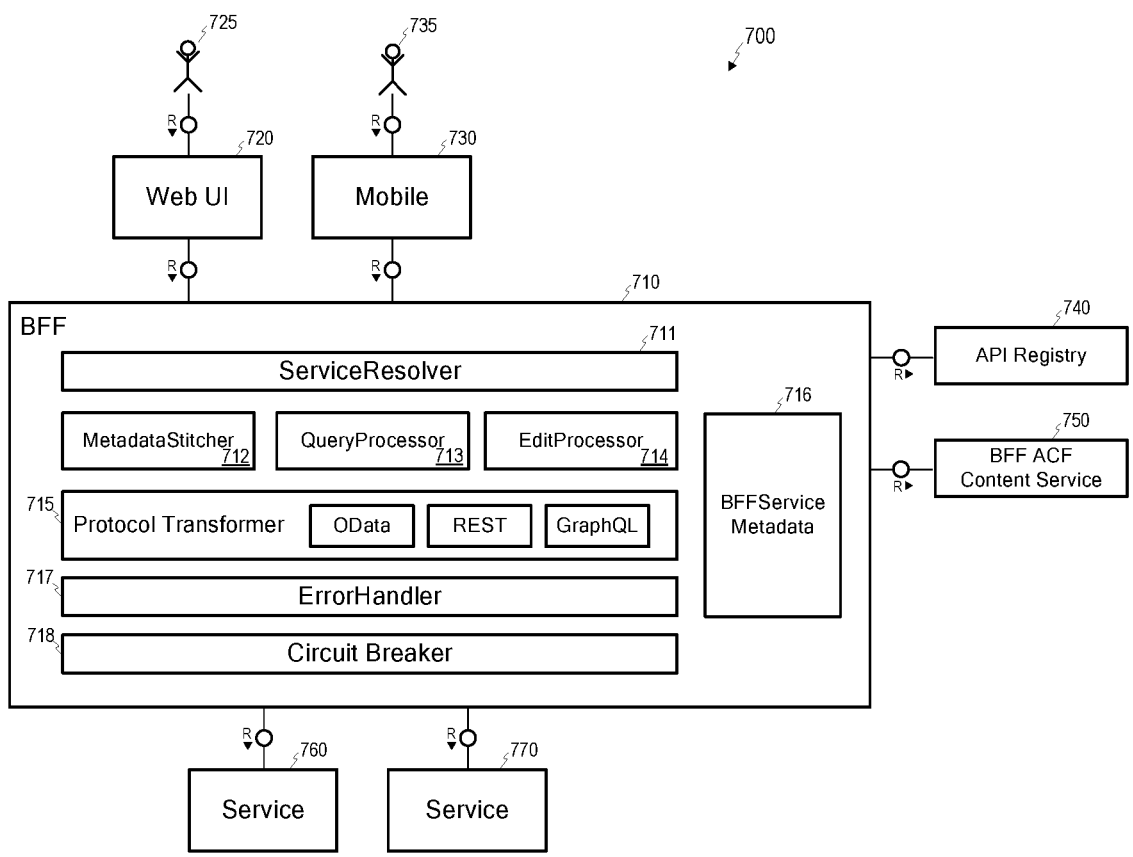
FIG. 7 is a block diagram of a BFF architecture according to some microservice embodiments.

FIG. 7 illustrates architecture 700 of a BFF according to some embodiments. As shown, BFF 710 may receive requests from web UI front-end application 720 operated by user 725 or from mobile front-end application 730 operated by user 735. The requests may comprise Uniform Resource Locators (URLs) transmitted via HyperText Transfer Protocol (HTTP).

ServiceResolver 711 may operate to parse a received URL to determine a requested API. ServiceResolver 711 may also determine a microservice associated with the requested API. API Registry 740 provides the API-to-microservice mappings used by ServiceResolver 711.

ServiceResolver 711 also loads a mashup service based on a protocol which corresponds to the determined microservice. BFF 710 provides mashup services for OData, REST and GraphQL API protocols. Protocol transformer 715 may further allow BFF 710 to expose a back-end microservice (e.g., microservice 760) of one protocol (e.g., REST) using another protocol (e.g., OData). Accordingly, front-end applications 720 and 730 may utilize desired protocols without requiring support of those protocols by the back-end.

MetdataStitcher 712 creates, based on an ACF, new OData metadata of a newly-created OData service from OData metadata of existing OData services. BFF ACF content service 750 allows BFF 710 to identify ACFs corresponding to requested functions, and BFFServiceMetadata 716 is the runtime instantiation of an ACF.

QueryProcessor 713 handles GET requests issued by BFF 710, while EditProcessor 714 is responsible for handling POST requests. Circuit Breaker 718 is a known microservices design pattern. In a case that microservice 760 is unresponsive and a received request required data from both microservice 760 and microservice 770, circuit breaker 718 may control BFF 710 to wait a limited time for a response from microservice 760 and to simply return data from microservice 770 if no response is received.

Figure 8:
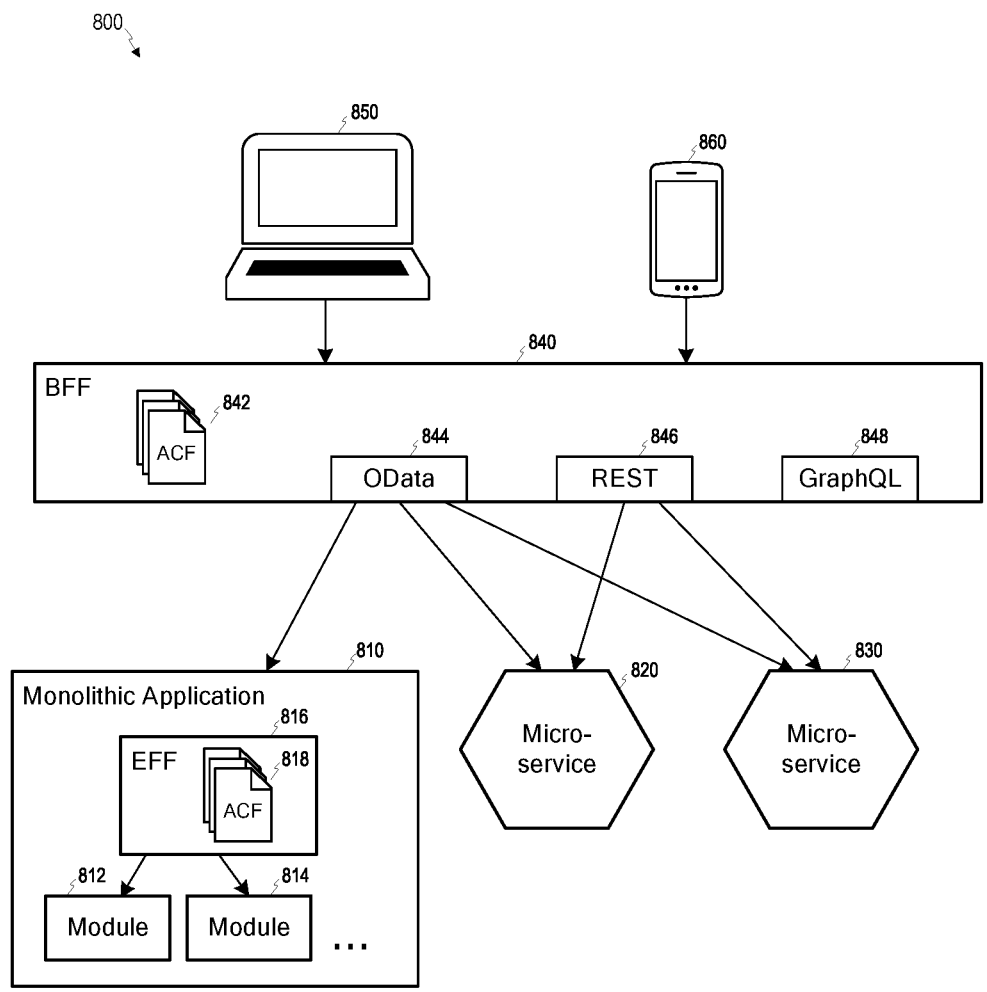
FIG. 8 illustrates an architecture including a BFF, microservices, and a monolithic application including an EFF according to some embodiments.

FIG. 8 is a block diagram of architecture 800 according to some embodiments. As shown, architecture 800 includes BFF 840 and monolithic application 810 including EFF 816. One or both of microservices 820 and 830 may have been migrated out of monolithic application 810. During the migration, as described above, one or more ACFs corresponding to functions provided by microservices 820 and 830 may have been moved from ACFs 818 to ACFs 842. Accordingly, front-end UI applications executing on devices 850 and 860 may continue to access such functions without requiring modification.

In one example of operation, BFF 840 receives a request from device 850 or 860. The request includes an API call to which none of ACFs 842 correspond. BFF 840 determines that the API call is associated with monolithic application 810 and the call is passed thereto. The call received by monolithic application 810 may, however, be associated with one of ACFs 818. Accordingly, EFF 816 may then execute process 400 as described above to make primary and secondary calls to modules 812 and 814 and to return a composed result set to the requesting front-end application via BFF 840.

In another example, a request received by BFF 840 corresponds to one of ACFs 842. A primary function and its associated protocol are identified from the ACF 842 and the primary functions is called as described above. It will be assumed that the ACF 842 defines a mashup property, and therefore a secondary function is identified and called as also described above. The primary function and the secondary function be provided by any combination of monolithic application 810, microservice 820 and microservice 830. In a case that the primary function or the secondary function are provided by monolithic application 810, the thusly-provided primary function or the secondary function may further be associated with an ACF 818 which defines a further mashup property to be handled by EFF 816 as described above.

Figure 9:
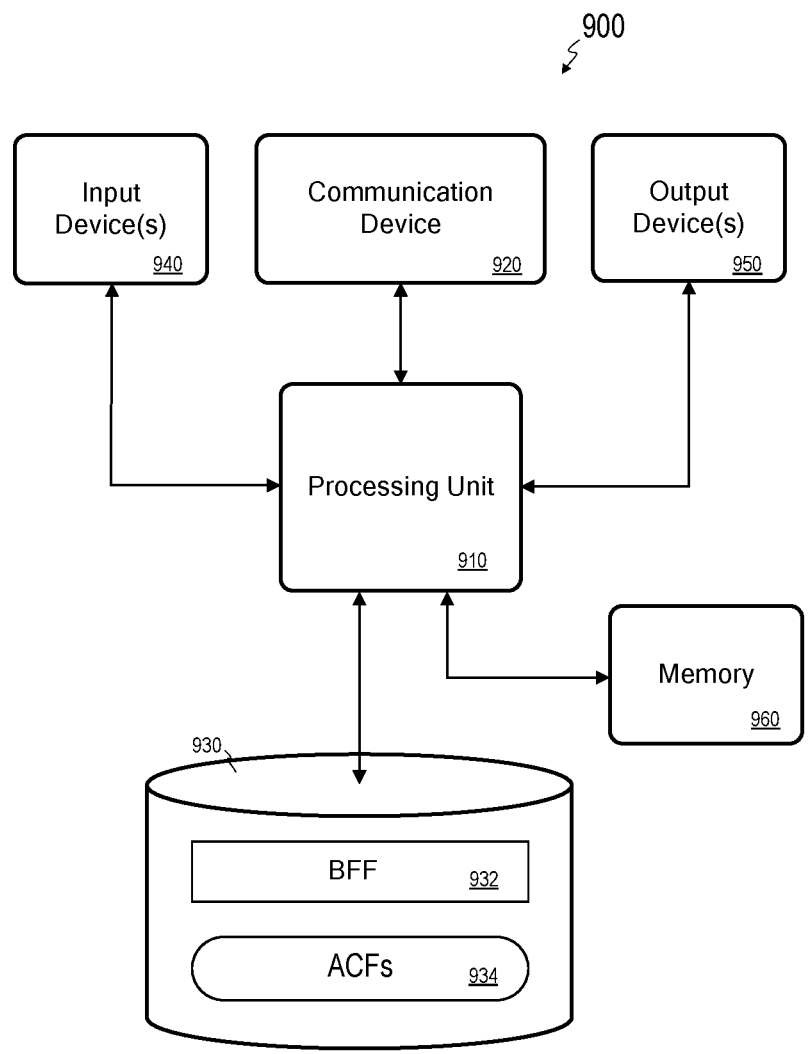
FIG. 9 is a block diagram of a system to provide a BFF and API configuration files according to some embodiments.

FIG. 9 is a block diagram of system 900 according to some embodiments. System 900 may comprise a general-purpose computing apparatus and may execute program code to perform any of the functions described herein. System 900 may comprise an implementation of BFF 540 or 840 in some embodiments. The elements of system 900 may be distributed across several physical devices, including cloud-based resources, and system 900 may include other unshown elements according to some embodiments.

System 900 includes processing unit 910 operatively coupled to communication device 920, data storage device 930, one or more input devices 940, one or more output devices 950 and memory 960. Communication device 920 may comprise a network card for communication with external networks. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into system 900. Output device(s) 950 may comprise, for example, a display screen, a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM), Storage Class Memory (SCM) or any other fast-access memory.

BFF 932 may comprise program code executable by processing unit 910 to cause system 900 to perform any one or more of the processes described herein. Embodiments are not limited to execution of these processes by a single system. API configuration files 934 may also be stored in data storage device 930 and utilized by BFF 932 as described above. Data storage device 930 may also store other data and/or program code for providing additional functionality and/or which are necessary for operation of system 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:

a memory storing processor-executable program code; and a processing unit to execute the processor-executable program code to cause the system to:

receive a call to a first function;

determine that the first function is associated with a first configuration file, the first configuration file indicating a primary service of a monolithic application and a primary request protocol of the monolithic application, a secondary service of a microservice and a secondary request protocol of the microservice, and a relationship between a first property of the primary service and a second property of the secondary service;

in response to the determination that the first function is associated with the first configuration file:

call the primary service of the monolithic application using the primary request protocol and receive a corresponding first result set;

call the secondary service of the microservice using the secondary request protocol, the call to the secondary service including a filter on the second property, the filter on the second property based on values of the first result set associated with the first property;

receive a second result set corresponding to the call to the secondary service;

generate a composed result set based on the first result set, the second result set, and the relationship between the first property of the primary service and the second property of the secondary service;

return the composed result set in response to the call to the first function;

receive a second call to a second function;

determine that the second function is not associated with any configuration file; and in response to the determination that the second function is not associated with any configuration file, direct the second call to a service associated with the second function.

2. A system according to claim 1, the processing unit to execute the processor-executable program code to cause the system to:
receive a third call to a third function;
determine that the third function is associated with a second configuration file, the second configuration file indicating a second primary service and second primary request protocol;
in response to the determination that the third function is associated with the second configuration file, call the second primary service using the second primary request protocol and receive a corresponding third result set; and
return the third result set in response to the third call to the third function.

3. A system according to claim 1, the processing unit to execute the processor-executable program code to cause the system to:
receive a third call to a third function;
determine that the third function is associated with a second configuration file, the second configuration file indicating a second primary service and second primary request protocol, a second secondary service and second secondary request protocol and a relationship between a third property of the second primary service and a fourth property of the second secondary service; and
in response to the determination that the third function is associated with the second configuration file:
call the second primary service using the second primary request protocol and receive a corresponding third result set;
call the second secondary service using the secondary request protocol, the call to the second secondary service including a filter on the fourth property, the filter on the fourth property based on values of the third result set associated with the third property;
receive a fourth result set corresponding to the call to the second secondary service;
generate a second composed result set based on the third result set, the fourth result set, and the relationship between the third property of the second primary service and the fourth property of the second secondary service; and
return the second composed result set in response to the third call to the third function.

4. A system according to claim 1, further comprising:
a second memory storing second processor-executable program code; and
a second processing unit to execute the second processor-executable program code to cause the system to:
receive a third call to the first function;
determine that the first function is associated with a second configuration file, the second configuration file indicating a second primary service and a second primary request protocol, a second secondary service and second secondary request protocol and a second relationship between a first property of the second primary service and a second property of the second secondary service; and
in response to the determination that the first function is associated with the second configuration file:
call the second primary service using the second primary request protocol, wherein the call to the second primary service comprises a first interprocess function call to a first microservice;
receive a first JavaScript Object Notation payload in response to the call to the second primary service;
parse the first JavaScript Object Notation payload to generate a third result set;
call the second secondary service, the call to the second secondary service including a filter on the second property of the second secondary service, the filter on the second property of the second secondary service based on values of the third result set associated with the first property of the second primary service;
receive a fourth result set corresponding to the call to the second secondary service;
generate a second composed result set based on the third result set, the fourth result set, and the relationship between the first property of the second primary service and the second property of the second secondary service; and
return the second composed result set in response to the third call to the first function.

5. A system according to claim 4, wherein the call to the second secondary service comprises a second interprocess function call to a second microservice, and
wherein receiving of the corresponding second result set comprises receiving and parsing of a second JavaScript Object Notation payload.

6. A system according to claim 1,
wherein reception of the corresponding first result set comprises parsing of a first JavaScript Object Notation payload, and
wherein reception of the corresponding second result set comprises parsing of a second JavaScript Object Notation payload.

7. A method comprising:
receiving a call to a first function;
determining that the first function is associated with a first configuration file, the first configuration file indicating a primary service of a monolithic application and a primary request protocol of the monolithic application, a secondary service of a microservice and a secondary request protocol of the microservice, and a relationship between a first property of the primary service and a second property of the secondary service; and
in response to determining that the first function is associated with the first configuration file:
calling the primary service of the monolithic application using the primary request protocol and receiving a corresponding first result set;
calling the secondary service of the microservice using the secondary request protocol, the call to the secondary service including a filter on the second property, the filter on the second property based on values of the first result set associated with the first property;
receiving a second result set corresponding to the call to the secondary service;
generating a composed result set based on the first result set, the second result set, and the relationship between the first property of the primary service and the second property of the secondary service;
returning the composed result set in response to the call to the first function;
receiving a second call to a second function;
determining that the second function is not associated with any configuration file; and
in response to determining that the second function is not associated with any configuration file, direct the second call to a service associated with the second function.

8. A method according to claim 7, further comprising:
receiving a third call to a third function;
determining that the third function is associated with a second configuration file, the second configuration file indicating a second primary service and second primary request protocol;
in response to determining that the third function is associated with the second configuration file, calling the second primary service using the second primary request protocol and receiving a corresponding third result set; and
returning the third result set in response to the third call to the third function.

9. A method according to claim 7, further comprising:
receiving a third call to a third function;
determining that the third function is associated with a second configuration file, the second configuration file indicating a second primary service and second primary request protocol, a second secondary service and second secondary request protocol and a relationship between a third property of the second primary service and a fourth property of the second secondary service; and
in response to determining that the third function is associated with the second configuration file:
calling the second primary service using the second primary request protocol and receiving a corresponding third result set;
calling the second secondary service using the second secondary request protocol, the call to the second secondary service including a filter on the fourth property, the filter on the fourth property based on values of the third result set associated with the third property;
receiving a fourth result set corresponding to the call to the second secondary service;
generating a second composed result set based on the third result set, the fourth result set, and the relationship between the third property of the second primary function and the fourth property of the second secondary service; and
returning the second composed result set in response to the third call to the third function.

10. A method according to claim 7, further comprising:
copying the first configuration file to a second configuration file;
receiving a third call to the first function;
determining that the first function is associated with the second configuration file, the second configuration file indicating a second primary service and second primary request protocol, a second secondary service and second secondary request protocol and a second relationship between a first property of the second primary service and a second property of the second secondary service; and
in response to determining that the first function is associated with the second configuration file:
calling the second primary service using the second primary request protocol , wherein the call to the second primary service comprises a first interprocess function call to a first microservice;
receiving a first JavaScript Object Notation payload in response to the call to the second primary service;
parsing the first JavaScript Object Notation payload to generate a third result set;
calling the second secondary service using the second secondary request protocol, the call to the second secondary service including a filter on the second property of the second secondary service, the filter on the second property of the second secondary service based on values of the third result set associated with the first property of the second primary service;
receiving a fourth result set corresponding to the call to the second secondary service;
generating a second composed result set based on the third result set, the fourth result set, and the relationship between the first property of the second primary service and the second property of the second secondary service; and
returning the second composed result set in response to the third call to the first function.

11. A method according to claim 10, wherein the call to the second secondary service comprises a second interprocess function call to a second microservice, and
wherein receiving the corresponding second result set comprises receiving and parsing of a second JavaScript Object Notation payload.

12. A method according to claim 7,
wherein receiving the corresponding first result set comprises parsing of a first JavaScript Object Notation payload, and
wherein receiving the corresponding second result set comprises parsing of a second JavaScript Object Notation payload.

13. A non-transitory computer-readable medium storing processor-executable program code, the program code executable to cause a system to:
receive a call to a first function;
determine that the first function is associated with a first configuration file associated with the first function, the first configuration file indicating a primary service of a monolithic application and a primary request protocol of the monolithic application, a secondary service of a microservice and a secondary request protocol of the microservice, and a relationship between a first property of the primary service and a second property of the secondary service;
in response to the determination that the first function is associated with the first configuration file:
call the primary service of the monolithic application using the primary request protocol and receive a corresponding first result set;
call the secondary service of the microservice using the secondary request protocol, the call to the secondary service including a filter on the second property, the filter on the second property based on values of the first result set associated with the first property;
receive a second result set corresponding to the call to the secondary service;
generate a composed result set based on the first result set, the second result set, and the relationship between the first property of the primary service and the second property of the secondary service;
return the composed result set in response to the call to the first function;
receive a second call to a second function;
determine that the second function is not associated with any configuration file; and
in response to the determination that the second function is not associated with any configuration file, direct the second call to a service associated with the second function.

14. A medium according to claim 13, the program code executable to cause a system to:
receive a third call to a third function;
determine that the third function is associated with a second configuration file, the second configuration file indicating a second primary service;
call the second primary service and receive a corresponding third result set; and
return the third result set in response to the second call to the second function.

15. A medium according to claim 13, the program code executable to cause a system to:
receive a third call to a third function;
determine that the third function is associated with a second configuration file, the second configuration file indicating a second primary service and primary request protocol, a second secondary service and secondary request protocol and a relationship between a third property of the second primary service and a fourth property of the second secondary service; and
in response to the determination that the third function is associated with the second configuration file:
call the second primary service using the second primary request protocol and receive a corresponding third result set;
call the second secondary service using the second secondary request protocol, the call to the second secondary service including a filter on the fourth property, the filter on the fourth property based on values of the third result set associated with the third property;
receive a fourth result set corresponding to the call to the second secondary service;
generate a second composed result set based on the third result set, the fourth result set, and the relationship between the third property of the second primary service and the fourth property of the second secondary service; and
return the second composed result set in response to the third call to the third function.

16. A medium according to claim 13,
wherein reception of the corresponding first result set comprises parsing of a first JavaScript Object Notation payload, and
wherein reception of the corresponding second result set comprises parsing of a second JavaScript Object Notation payload.

* * * * *